L. ARMBRUSTER.
COOKING UTENSIL.
APPLICATION FILED AUG. 2, 1919.

1,338,547.

Patented Apr. 27, 1920.

WITNESSES
Bernard Albly

INVENTOR
Leopold Armbruster
BY
ATTORNEYS

UNITED STATES PATENT OFFICE.

LEOPOLD ARMBRUSTER, OF NEW YORK, N. Y.

COOKING UTENSIL.

1,338,547.	Specification of Letters Patent.	Patented Apr. 27, 1920.

Application filed August 2, 1919. Serial No. 314,805.

*To all whom it may concern:*

Be it known that I, LEOPOLD ARMBRUSTER, a citizen of the United States, and a resident of the city of New York, borough of Manhattan, in the county and State of New York, have invented a new and Improved Cooking Utensil, of which the following is a full, clear, and exact description.

This invention relates to a cooking utensil, and aims to provide a device wherein fluids such as milk may be brought to a temperature just below boiling without any danger of the same overflowing the side walls of the utensil, or scorching, as is now the case.

It is well appreciated that any number of devices have been constructed and patented with a view of providing a cooking utensil which would be capable of receiving milk, or a similar fluid, which, upon reaching the boiling point, expands to a great extent and overflows the upper edges of the receptacle in which it is contained. These devices have depended upon a circulation system, and an example of such a device is to be found in the patent to Finklestein, No. 520305. This structure and similar structures have proven more or less faulty in operation for the reason that the inverted funnel-like member does not extend to a point adjacent the side edges of the receptacle and, consequently, the fluid has boiled between the outer edge of the funnel and the side walls of the receptacle, resulting in no great improvement in operation over an ordinary cooking utensil.

In view of the foregoing, I have constructed a cooking utensil in which this difficulty is avoided, and which is illustrated in the accompanying sheet of drawings, in which—

Figure 1:
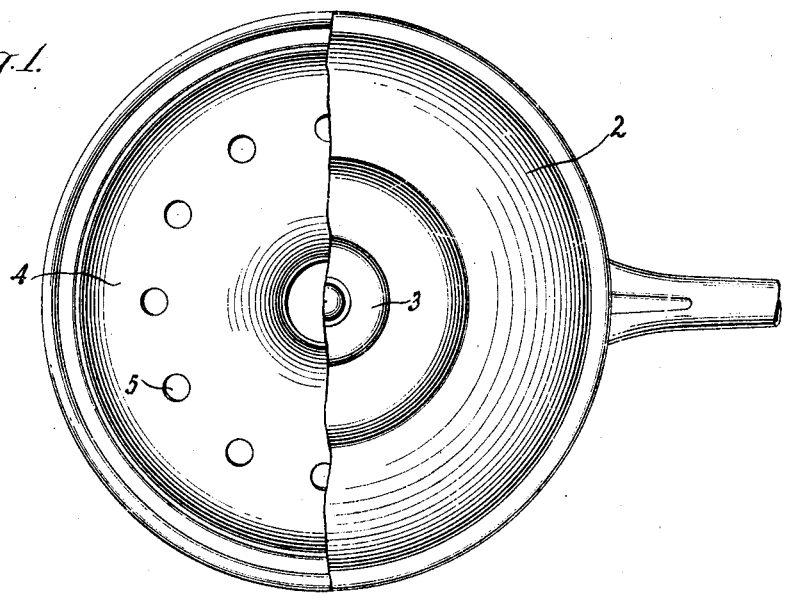
Figure 2:
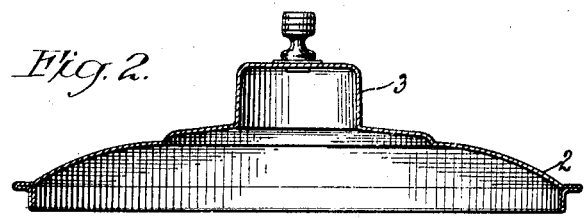
Figure 2:
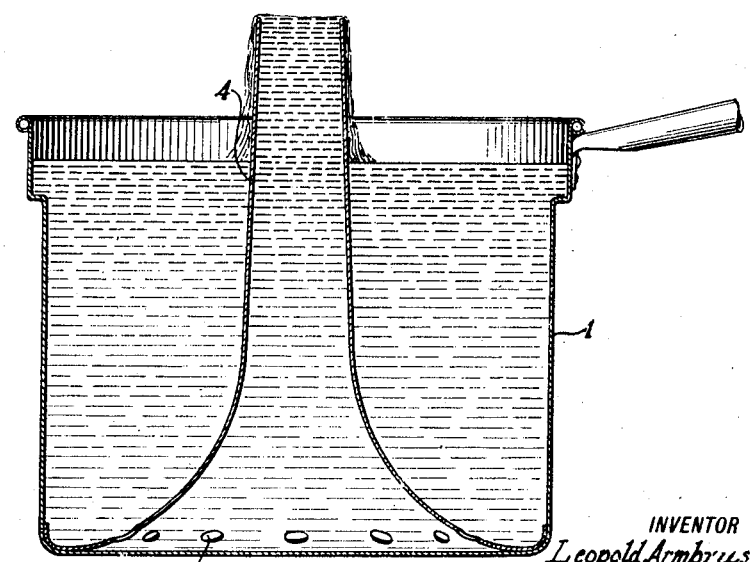

Figure 1 is a plan view of my improved cooking utensil with a portion of the lid removed so as to reveal the underlying structure; and Fig. 2 is a sectional side view.

In these views like reference numerals designate similar parts, and the reference numeral 1 indicates a receptacle, which may be of any desired contour. Fitted to the upper edge of this receptacle is a removable lid 2, which is formed centrally with a recessed portion 3, for a purpose hereinafter more fully specified.

Positioned within the receptacle 1 is an inverted funnel-like member 4, the upper edge of which extends beyond the upper edge of the body of the receptacle. The funnel member 4 is provided adjacent its lower edge with openings 5, it being noted that the lowermost edges of such member project to and contact with the inner face of the side walls of the receptacle 1.

It will now be seen that upon fluid, such as milk, being placed in the receptacle the same, upon reaching the boiling point within the funnel 4, will pass upwardly through the spout and, as indicated in Fig. 2 of the drawings, will fall back upon the upper surface of the fluid contained within the receptacle.

Any boiling of the fluid exteriorly of the funnel is eliminated by the lowermost edges of the same extending to the side walls of the receptacle, so that fluid to be heated will have to pass through the openings 5 and into the interior of the funnel 4.

It will be noted that the recessed portion 3 of the lid 2 accommodates the upper edge of the spout of the funnel member.

Obviously, certain modifications within the scope of my claim may readily be resorted to without departing from the spirit of my invention.

Having thus described my invention, I desire to claim:

A cooking receptacle including a base and side walls, an inverted funnel like member positioned within such receptacle and having the outer edges of its funnel portion bearing against the inner faces of the base and side walls of the receptacle, the upper end of such member projecting above the upper level of the fluid positioned within the same, such member being formed with openings through its body portion and inwardly from its point of contact with the receptacle.

LEOPOLD ARMBRUSTER.